Figure 1:
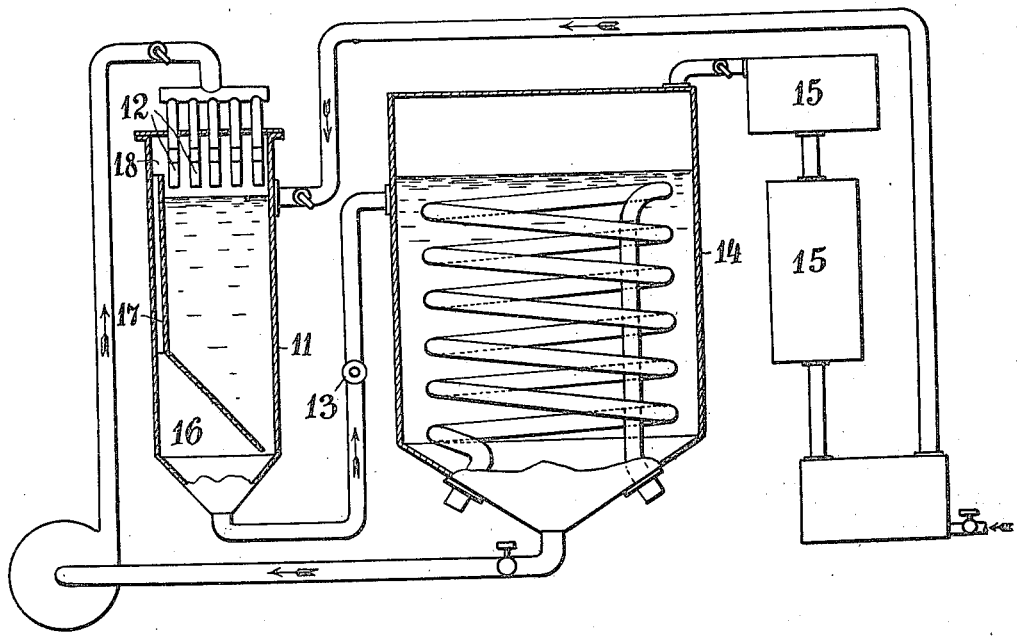

K. BIRKELAND & O. DEVIK.
PROCESS OF HARDENING OILS.
APPLICATION FILED APR. 10, 1913.

1,125,259.

Patented Jan. 19, 1915.
2 SHEETS—SHEET 1.

Witnesses:

Inventors.
Kristian Birkeland
Olaf Devik
By
Atty.

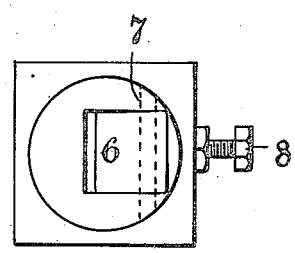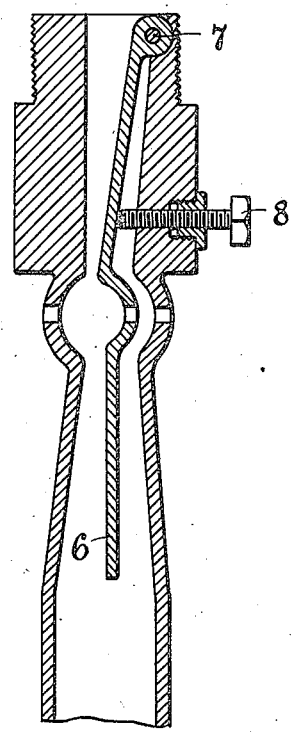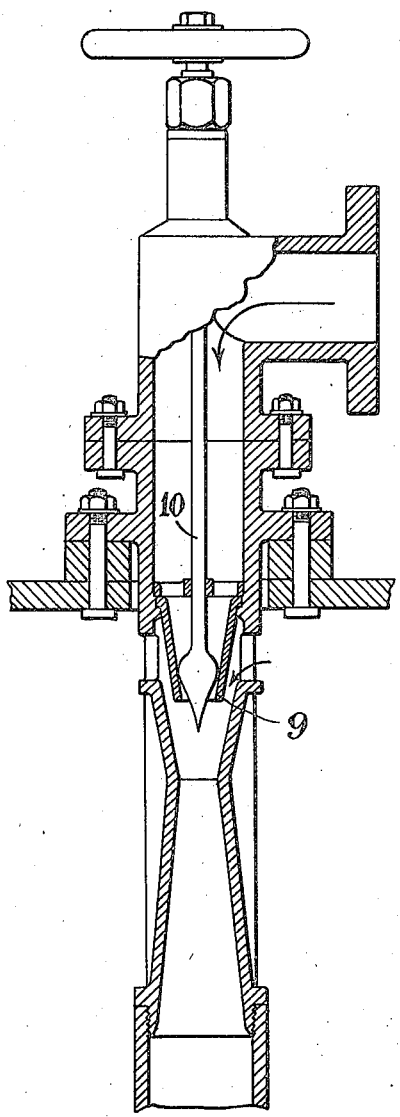

UNITED STATES PATENT OFFICE.

KRISTIAN BIRKELAND AND OLAF DEVIK, OF CHRISTIANIA, NORWAY.

PROCESS OF HARDENING OILS.

1,125,259.  Specification of Letters Patent.  Patented Jan. 19, 1915.

Application filed April 10, 1913. Serial No. 760,227.

*To all whom it may concern:*

Be it known that we, KRISTIAN BIRKELAND and OLAF DEVIK, subjects of the King of Norway, residing at Incognitogaten 16 and Underhougsveien 13, Christiana, Norway, respectively, have invented certain new and useful Improvements in Processes of Hardening Oils; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a process for treating oils and fats for the purpose of raising the melting point of such substances.

It is known that by treating oils with hydrogen the oils may be transformed into fats, that is to say the unsaturated fatty substances are transformed into saturated compounds and this is effected by bringing about an intimate contact between the oils and hydrogen, preferably in the presence of a catalytic agent such as a metal supported in a finely divided state upon an inorganic material for instance kieselguhr. This known process has in some cases been carried out by introducing hydrogen gas and oil together with the catalyzer under high pressure in an autoclave where the substances are brought into the most intimate contact possible with one another. In the processes hitherto known it has been tried to bring about this intimate contact by violently agitating the oil by means of blowing hydrogen into the oil or by producing a spray of oil which is blown into the hydrogen atmosphere. Each of these methods has its advantages and its deficiencies, and it has therefore been tried to combine them for the purpose of obtaining the most powerful action possible.

The applicants have now found by experiments that a thorough mixing of oil and hydrogen and a very efficient hardening process is established by causing a mixture of oil and a catalyzer in the form of a jet to pass an atmosphere of hydrogen so as to take up hydrogen by suction. When the mixture so produced is directed in the form of a jet into an oil reservoir toward the bottom of this latter, that part of the gas bubbles, which still have not been completely absorbed that is have not become sufficiently subdivided, will slowly rise to the surface and will be absorbed on passing through the oil.

The present invention consists in a process which is based upon these principles and which is described below with reference to the accompanying drawing in which—

Figure 1 is a side view partly in section of an apparatus for carrying out the process. Fig. 2 is a mixing device shown in section on an enlarged scale. Fig. 3 shows a mixing device of a modified construction.

The process is suitably carried out at a temperature of about 150° C. and a pressure of about 10 to 15 atmospheres. When a suitable catalyzer for instance pyrophoric nickel and a good oil is employed the hardening will be effected in from ½ to 1 hour.

In carrying out the present process it is of advantage to employ injectors which are so constructed that the shape or thickness of the oil jet may be altered, because such alterations during the working has proved to be necessary in order to obtain at each moment the best possible atomizing and distribution of the gas in the liquid. To obtain this a member adjustable from the outside may be provided in the injector.

In the ejector illustrated in Fig. 2 of the drawing the injector boring has the shape of a broad rectangular channel provided with a tongue 6 pivoted at 7 and adjustable from outside by means of a screw 8.

In the injector illustrated in Fig. 3 the injector boring is circular and tapering toward the opening at 9 and in the boring a longitudinally adjustable needle 10 with a tapering end is arranged, so that a jet of an annular section is produced. It has been found that in some cases it is of very great advantage to carry out the process in such manner that the mixture produced is subjected to a rapid change in pressure for instance by passing a reduction valve. This treatment may for instance be carried out in the plant illustrated in Fig. 1 and in the manner below described.

The oil is introduced into the vessel 11 through the injector nozzles 12 so as to produce a mixture of the very hot oil with hydrogen. This milky white mixture in which the bubbles of hydrogen are so small that they could not be observed with the bare eye, is then introduced through a reduction valve 13 into a larger vessel 14. It has been found that under this expansion the intimate mixture of oil and hydrogen gives off a large part of hydrogen and malodorous volatile substances which latter may be condensed and washed out by passing the gas through a condensation and washing apparatus 15. This has the great advantage of eliminating several substances (volatile amins, water, etc.,) before the addition of the catalyzer, whereby on the one hand an unnecessary inactivation of the catalyzer is obviated while on the other hand hydrogen is consumed only for the purpose of hardening the oil itself and not for the hydration of the said volatile bodies.

In the expansion vessel 14 the amount of hydrogen given off by the dilation of the bubbles will be greater when the pressure is low. This vessel (14) may be of a lighter construction than the pressure vessel 11 and is preferably of larger dimensions than this latter. In the pressure vessel a chamber 16 may be arranged in the manner shown in Fig. 4 where part of the hydrogen bubbles, which may be of a larger size can be collected and rise through a pipe 17 into a hydrogen chamber which may either be the space 18 in the vessel 11 or another vessel outside of the pressure vessel. By this arrangement only the hydrogen which is distributed in the smaller bubbles and presenting therefore the greatest contact surface to the oil, will pass into the expansion vessel 14. The hydrogen gas, after having passed through the vessel 14 and having thereupon been purified is then again compressed in a chamber 19, which may contain a centrifugal pump (not shown) and brought into circulation anew by being introduced into the hydrogen space 18. When the oil has in this manner been freed from various malodorous volatile substances the hardening process may be started in that the catalyzer is introduced into the oil. During the hardening process the same circular process as before described may be maintained or the inlet to the expansion plant may be closed and the oil maintained in circulation only through the pressure vessel 11.

It is to be remarked, that a treatment of the raw material or of the final product with water vapor combined with a subsequent treatment under a lower pressure could be easily carried out in the plant above described. In this case steam of a suitable pressure is introduced into the vessel 11 instead of hydrogen while the vessel 14 is maintained under a vacuum.

It has been found that in many cases the catalyzer does not admit of being stored for a long time so that it should be employed to the greatest extent possible when new. As the present process enables a complete hardening to be effected in one half of an hour it is of advantage immediately after the completion of the process to separate off the larger quantity of the catalyzer under the hydrogen pressure employed and then immediately to introduce this catalyzer again into a new charge of oil to be hardened.

It is a matter of fact, that a catalyzer, which has been completely freed from the hydrogen atmosphere and then has been standing for some days, without having been used is not nearly so efficient as when it is freshly prepared.

We claim:

1. The process of hardening oils which comprises mixing the oil with a catalyzer, forming an unconfined jet of the mixture and causing the jet to pass first through an atmosphere of hydrogen and then onto a body of oil whereby hydrogen will be carried down into said body of oil and be absorbed as it rises through the latter.

2. The process of hardening oils which consists in mixing the oil with a catalyzer, passing the mixture in the form of a jet through an atmosphere of hydrogen so as to absorb hydrogen by suction, said jet being directed into a reservoir of oil so that hydrogen is carried down into the oil and absorbed while rising to the surface, and subjecting the oil subsequently to this treatment to a rapid change in pressure.

3. The process of hardening oils which consists in mixing the oil with a catalyzer, passing the mixture in the form of a jet through an atmosphere of hydrogen so as to absorb hydrogen by suction, said jet being directed into a reservoir of oil so that hydrogen is carried down into the oil and absorbed while rising to the surface said treatment taking place under a high pressure, subjecting the oil thereupon to a rapid reduction in pressure, introducing the oil into a vessel maintained under a low pressure and from this vessel again into the high pressure reservoir.

4. The process of hardening oils which consists in mixing the oil with a catalyzer, passing the mixture in the form of a jet through an atmosphere of hydrogen so as to absorb hydrogen by suction, said jet being directed into a reservoir of oil so that hydrogen is carried down into the oil and absorbed while rising to the surface said treatment taking place in a vessel maintained under a high pressure, maintaining the oil in circulation from this high pressure vessel through a low pressure vessel and back into the high pressure vessel.

5. The process of hardening oils which consists in maintaining the oil in circulation through suitable injectors under a low pressure withdrawing the volatile substances hereby expelled mixing the oil with a catalyzer, passing the mixture in the form of a jet through an atmosphere of hydrogen so as to absorb hydrogen by suction, said jet being directed into a reservoir of oil so that hydrogen is carried down into the oil and absorbed while rising to the surface.

In testimony that we claim the foregoing as our invention, we have signed our names in presence of two subscribing witnesses.

KRISTIAN BIRKELAND.
OLAF DEVIK.

Witnesses:
M. E. GUBBODENSLY,
RUTH LINDSTRÖM.